US007279064B2

(12) United States Patent
Daniel et al.

(10) Patent No.: US 7,279,064 B2
(45) Date of Patent: Oct. 9, 2007

(54) METHOD OF SEALING AN ARRAY OF CELL MICROSTRUCTURES USING MICROENCAPSULATED ADHESIVE

(75) Inventors: Jurgen Hans Daniel, Mountain View, CA (US); Brent Shawhan Krusor, Fremont, CA (US); Michael Charles Weisberg, Woodside, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 319 days.

(21) Appl. No.: 10/739,621

(22) Filed: Dec. 18, 2003

(65) Prior Publication Data

US 2005/0133154 A1 Jun. 23, 2005

(51) Int. Cl.
 *B32B 37/12* (2006.01)
(52) U.S. Cl. .................. 156/295; 156/292; 156/273.7; 156/275.7
(58) Field of Classification Search ................. None
 See application file for complete search history.

(56) References Cited

U.S. PATENT DOCUMENTS

| 7,037,024 B2 * | 5/2006 | Steinwender ............... 403/267 |
| 2002/0008898 A1 | 1/2002 | Katase |
| 2003/0035885 A1 | 2/2003 | Zang et al. |
| 2005/0128582 A1 * | 6/2005 | Gibilini ..................... 359/455 |

FOREIGN PATENT DOCUMENTS

WO WO 01/67170 A1 9/2001
WO WO 02/01281 A2 1/2002

OTHER PUBLICATIONS

Durant, Yvon G., PhD, MBA, "Microcapsule Morphology in Microencapsulation Processes, Fundamental Chemical Differences"; PowerPoint presentation, University of New Hampshire; Jul. 22, 2002, pp. 1-28.
Homola, J., "Color-Changing Inks, Brighten your bottom line"; Color Change Corp. for Screen Printing Magazine; http://www.screenweb.com/inks/cont/brighten981119.html; Dec. 15, 2003, pp. 1-5.
"AVEKA Novel Processing Technologies . . . "; Aveka Group-Particle Processing And Custom Research; http://www.thomasregister.com/olc/73439614/about4.htm; Dec. 15, 2003, pp. 1-2.

* cited by examiner

*Primary Examiner*—Jessica Ward
(74) *Attorney, Agent, or Firm*—Fay Sharpe LLP

(57) ABSTRACT

A method for sealing microstructured cells, which are defined by at least a first substrate and a wall microstructure extending from the first substrate, includes a step of applying a plurality of adhesive microcapsules along at least one of a first side of a second substrate and an exposed end portion of the wall microstructure. The adhesive microcapsules containing an adhesive substance. Another step includes positioning the first side of the second substrate adjacent the end portion of the wall microstructure. Still another step includes rupturing at least a portion of the plurality of adhesive microcapsules dispensing the adhesive substance between the end portion of the wall microstructure and the first side of the second substrate. A microstructure is also provided.

35 Claims, 5 Drawing Sheets

METHOD OF SEALING AN ARRAY OF CELL MICROSTRUCTURES USING MICROENCAPSULATED ADHESIVE

BACKGROUND

The present exemplary embodiment relates broadly to the art of microcell structures, and, more particularly, to a method of sealing cells within a microstructure using adhesive microcapsules. It finds particular application in conjunction with sealing the individual cells of an array of cell microstructures in displays and other similar output devices, and will be described with particular reference thereto. However, it is to be appreciated that the present exemplary embodiment is equally applicable for use in other amenable applications and/or environments in which individually sealed microstructures are used and in which excess liquid adhesive would be a disadvantage. Suitable microstructures include microcells, microchambers, microchannels and microtubes, for example, and any other suitably sized well, cavity or structural configuration regardless of how formed.

A variety of products are known to utilize microstructural cell arrays. Such products include elecrophoretic displays, for example, which retain electrophoretic ink within arrays of cells formed between sheets of a relatively rigid substrate, such as glass, for example. Using rigid sheets of glass enables a compression seal to be formed with the walls of each cell by securing and sealing the sheets of glass to one another along the periphery thereof, such as on a frame, for example. Thus, the cell walls are compressed between the glass forming compression or other fluid-tight seals that retain the electrophoretic ink in the cells. This is an example of a known construction of a rigid display.

Recent efforts have been directed to the development of flexible constructions, such as products referred to as "electronic paper" and/or other pliable displays and graphical output products, for example. Obviously, such constructions cannot be formed from sheets of glass or other relatively rigid materials. Rather, these flexible constructions utilize pliable sheets or substrates between which the microcells are captured. While on rigid displays only the perimeter of the construction is generally sealed, more flexible constructions require that the individual microcells are each substantially sealed. Otherwise, the contents of the individual microcells will flow or otherwise shift between the cells resulting in an undesirable performance and/or appearance of the flexible product.

In one known method of sealing the microcells, a wall microstructure is provided on a first flexible substrate. A second flexible substrate is coated with a substantially continuous layer of adhesive or sealant and positioned on the end portion of the wall microstructure to effectively seal the microcells. The continuous layer of adhesive, however, is typically formed from a liquid. This is a significant disadvantage because the excess liquid adhesive that is not used in forming the bond with the wall microstructure of the microcells tends to migrate into or otherwise intermix with the contents of the cells. This typically undesirably affects the substance captured within the cells.

For example, where the content of the cells is an electrophoretic ink, the adhesive can flow into and mix with the liquid ink and, once solidified, can limit particulate migration reducing the performance of the electrophoretic ink. The cured adhesive can also have other undesirable effects, such as reducing optical clarity and/or contrast of the cells, for example. Furthermore, where the contents of the cells is a dry, powdery substance, such as toner or charged pigments in general, biological powders such as spores, or light-emitting powders such as phosphors, for example, the excess adhesive tends to undesirably agglomerate and/or solidify the particles, again, reducing the performance and operation of the cells. In still another application, the excess adhesive can become affixed to or otherwise interfere with the operation of a micromechanical or microelectromechanical device, such as a microaccelerometer, a micromirror device, or a pressure sensor, for example, that is disposed within a cell. One example of such an application would include packaging and/or hermetic sealing of the micromechanical or microelectromechanical device.

In another known method of sealing microcells, the use of a second substrate is avoided and each cell is sealed with a layer of liquid adhesive. Such constructions, however, also have a number of disadvantages. One such disadvantage is that the method is only practical when used in association with liquid contents of the cells. This is due, at least in part, to the problems and disadvantages discussed above with regard to the use of a liquid adhesive in association with powdered substances and/or microelectromechanical devices. Another disadvantage is that the liquid adhesive and the liquid cell contents must have specific properties relative to one another that, thus, limit the wide application and use of this method. For example, in one application, it is desired for the liquid adhesive to have a lower specific gravity than the liquid contents of the cells. In this way, the liquid adhesive will "float" on the contents of the cells and can thereafter be cured to effectively seal the open end of the cells.

BRIEF DESCRIPTION

In accordance with one aspect of the present exemplary embodiment, a method for sealing microstructures is provided. The microstructures are defined by at least a first substrate and a wall microstructure that extends from the first substrate. The method includes a step of applying a plurality of adhesive microcapsules along at least one of a first side of a second substrate and an exposed end portion of the wall microstructure. The adhesive microcapsules contain an adhesive substance. Another step includes positioning the first side of the second substrate adjacent the end portion of the wall microstructure. A further step includes rupturing at least a portion of the plurality of adhesive microcapsules dispensing the adhesive substance between the end portion of the wall microstructure and the first side of the second substrate.

In accordance with another aspect of the present exemplary embodiment, a structure is provided and includes a first substrate and a wall microstructure extending from the first substrate that has an exposed end portion. The structure includes a second substrate having a first side positioned adjacent the end portion of the wall microstructure and an adhesive substance disposed between the end portion of the wall microstructure and the first side of the second substrate. The adhesive substance is dispersed from a plurality of microcapsules disposed on one of the exposed end portion of the wall microstructure and the first side of the second substrate.

In accordance with a further aspect of the present exemplary embodiment, a method of enclosing a plurality of microstructural chambers is provided and includes a step of providing a first substrate and a second substrate. The first substrate has a wall microstructure with an exposed end portion forming the plurality of microstructural chambers. Another step includes applying a plurality of microcapsules along one of a first side of the second substrate and the end portion of the wall microstructure. The microcapsules containing one of an adhesive substance and a first component of a multi-part adhesive substance. Another step includes positioning the first side of the second substrate adjacent the end portion of the wall microstructure. Still a further step includes urging the second substrate toward the end portion of the wall microstructure with a force of sufficient magnitude to rupture at least a portion of the plurality of microcapsules.

DETAILED DESCRIPTION

Figure 1:
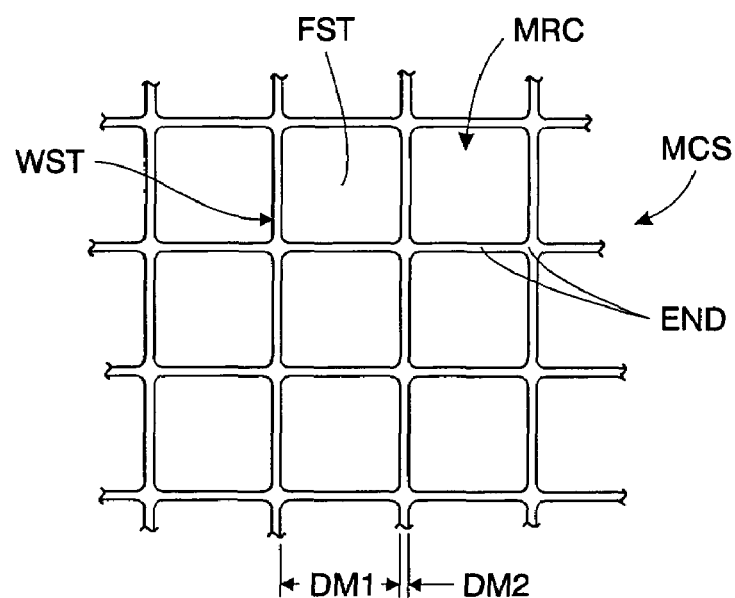
FIG. 1 is a top plan view of a known cell microstructure.

Referring now to the drawings, wherein the showings are for the purpose of illustrating exemplary embodiments only and not for the purpose of limiting the same, FIG. 1 illustrates a known microcellular structure MCS having a wall microstructure WST formed or otherwise supported on a bottom or first substrate FST defining a plurality of microcells MRC. Wall microstructure WST can be formed in any suitable manner, such as by photolithography, embossing, molding or other microfabrication techniques, for example, and can be formed as a unitary wall microstructure or from an arrangement of discrete, individual walls. Wall microstructure WST includes end walls or portions END that commonly extend in a generally planar manner in substantial alignment with first substrate FST. Microcells MRC are shown in FIG. 1 as being substantially square, having cell dimensions DM1 of any suitable value, such as from about 50 microns to about 1000 microns. However, microcells can be formed in any suitable shape or configuration. Additionally, wall microstructure WST is formed from wall portions having a wall thickness dimension DM2 of any suitable value, such as from about 5 to about 100 microns, for example.

Figure 2:
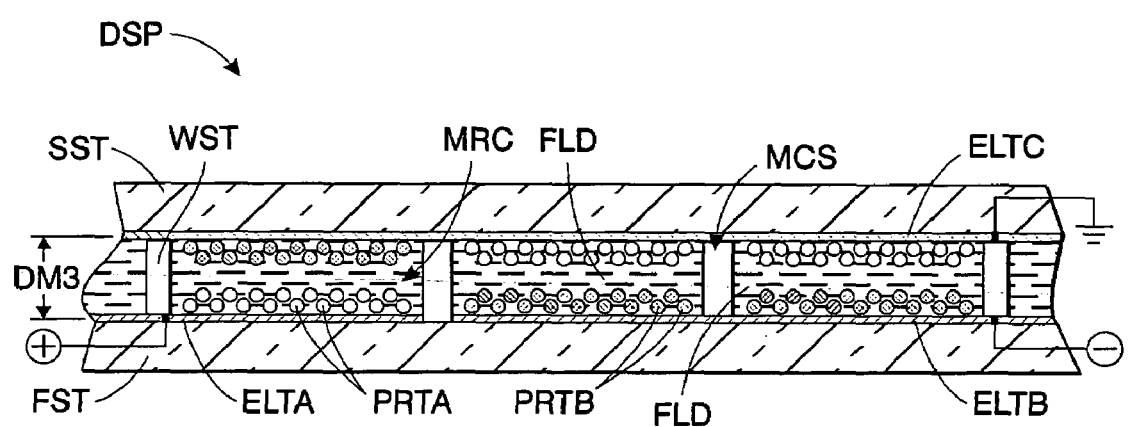
FIG. 2 is a side view, partially in cross section, of cell microstructures sealed between rigid substrates.

FIG. 2 illustrates a known display DSP having microcellular structure MCS captured between relatively rigid substrates, such as first substrate FST and second substrate SST. Wall microstructure WST of microcell structure MCS forms microcells MRC as shown in FIG. 1. Wall microstructure WST can have a height dimension DM3 of any suitable value, such as from about 20 microns, to about 500 microns, for example. It will be appreciated, however, that ranges of suitable dimensions, such as the foregoing examples, are largely application specific. For example, in displays using electrophoretic ink the dimensional values are generally smaller than, for example, the dimensional values in displays using powder. As such, the recitation of the foregoing examples of suitable dimensional ranges is not intended to be in any way limiting.

The microcells shown in FIG. 2 are filled with an electrophoretic ink or other fluid FLD having a plurality of oppositely charged particles PRTA and PRTB suspended therein. In display DSP, a plurality of electrodes, such as electrodes ELTA, ELTB and ELTC are respectively disposed along the first and second substrates. In FIG. 2, electrode ELTA is positively charged relative to electrode ELTC which is grounded, thereby attracting negatively charged particles, such as particles PRTA, and repelling positively charged particles, such as particles PRTB, for example. Electrode ELTB is negatively charged relative to electrode ELTC and thereby attracts positively charged particles, such as particles PRTB, and repels negatively charged particles, such as particles PRTA.

Display DSP in FIG. 2 is shown without a glue, adhesive or other seal-forming substance disposed between the substrates and the wall microstructure. Due to the relatively rigid nature of the first and second substrates, a compressive seal is formed between the substrates and the wall microstructure by securing together and sealing the substrates along the periphery thereof.

Figure 3:
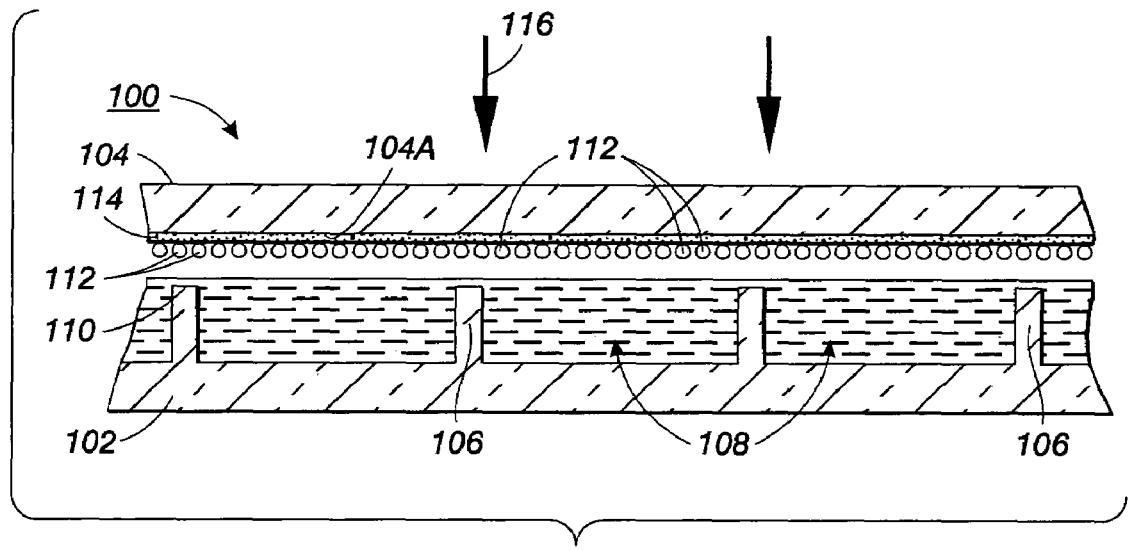
FIG. 3 is a side view, partially in cross section, of a plurality of adhesive microcapsules disposed on a substrate prior to assembly on a wall microstructure.

FIG. 3 illustrates a microcell structure 100 having a first substrate 102, a second substrate 104 in spaced relation to the first substrate, and a wall microstructure 106 disposed therebetween on the first substrate. Wall microstructure 106 can take any suitable shape, form and/or configuration and can be integrally formed with first substrate 102 or secured thereon in a suitable manner. Also, wall microstructure 106 can be formed in a unitary manner or include a plurality of individual wall portions suitably arranged to form the wall microstructure. For example, the individual wall portions can be configured such that gaps or other discontinuities are formed between the microcells. In any case, wall microstructure 106 at least partially defines a plurality of microcells 108 suitable for retaining a substance and/or device.

Figure 4:
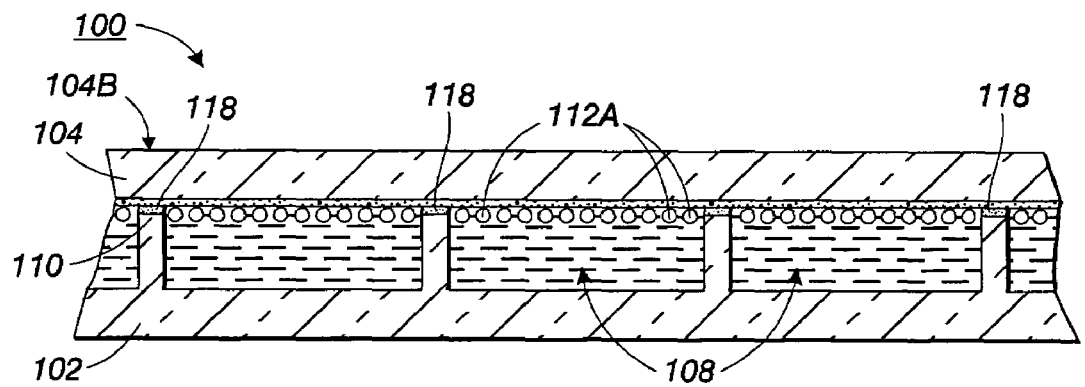
FIG. 4 is a side view, partially in cross section, of the substrate in FIG. 3 positioned on the wall microstructure with a plurality of adhesive microcapsules ruptured.

Wall microstructure 106 also includes an end wall portion 110. The end wall portion is shown in FIG. 3 as being substantially planar. However, it will be appreciated that any suitable shape, form and/or configuration can be used. Second substrate 104 has a plurality of adhesive microcapsules 112 supported on a first side 104A of second substrate 104. It will be appreciated from FIG. 3 that second substrate 104 extends substantially horizontally and that first side 104A is the underside of the substrate. As such, an adhesive layer 114 can be used to adhere or otherwise secure microcapsules 112 to first side 104A of second substrate 104. It will be appreciated that second substrate 104 is shown in FIGS. 3 and 4 as being generally horizontal. However, the second substrate can take any suitable orientation, such as being flexed or disposed at an incline, for example.

To assemble structure 100, second substrate 104 is displaced toward first substrate 102, as indicated by arrow 116, until first side 104A of second substrate 104 is adjacent end portion 110 of wall microstructure 106. As the second substrate approaches the wall microstructure, a portion of microcapsules 112 are compressively captured between a first contact point, such as first side 104A, and a second contact point, such as end portion 110. Upon applying a force of sufficient magnitude to second side 104B of second substrate 104, the portion of the plurality of microcapsules compressively captured between the opposing contact points are caused to rupture, thereby locally dispensing the adhesive contained therein between and along first side 104A of second substrate 104 and end portion 110 of wall microstructure 106. As shown in FIG. 4, each individual cell 108 is substantially sealed by adhesive substance 118, and any remaining adhesive microcapsules 112A simply remain captured within the fully enclosed cells.

The force applied to the second substrate should be of sufficient magnitude to rupture the microcapsules. However, any suitable application of force or combination of forces can be used to rupture the microcapsules. In one exemplary embodiment, the force includes the application of a shear force along the second substrate, such as by using ultrasonic agitation, for example. In other exemplary embodiments, the force can be applied by pressure across the second side of the second substrate of sufficient magnitude to rupture the microcapsules. It will be appreciated that the magnitude of the force required to rupture the microcapsules will depend on the composition thereof including the thickness of the shell of the microcapsules and the material from which they are formed. As such, a force of any suitable application and/or magnitude can be used.

Adhesive microcapsules 112 can be formed in any suitable manner as are well known by those of skill in the art and, in one embodiment, contain a suitable adhesive, such as radiation (e.g., ultraviolet light or visible light) and/or heat curable adhesive, for example. Alternately, the adhesive can be a multi-part adhesive, such as a two-part epoxy, for example. In such case, one component of the multi-part epoxy can be microencapsulated with the one or more other parts being applied along one of first side 104A and end portions 110. For example, adhesive layer 114 could be formed from a substance suitable for both retaining microcapsules 112 on first side 104A and for acting as a second component of a multi-part adhesive. Adhesive layer 114 can be from about 5 microns to about 50 microns in thickness and can be deposited in any suitable manner, such as by dip-coating, spray-coating, spin-coating, roll-coating, screen printing, electrodeposition, doctorblading and/or transfer techniques, as are well known in the art. Microcapsules 112 are preferably substantially spherical in shape and have a diameter from about 5 microns to about 50 microns. However, it is to be distinctly understood that any suitable size, shape or form of microencapsulated adhesive or component part thereof can be used.

Figure 5:
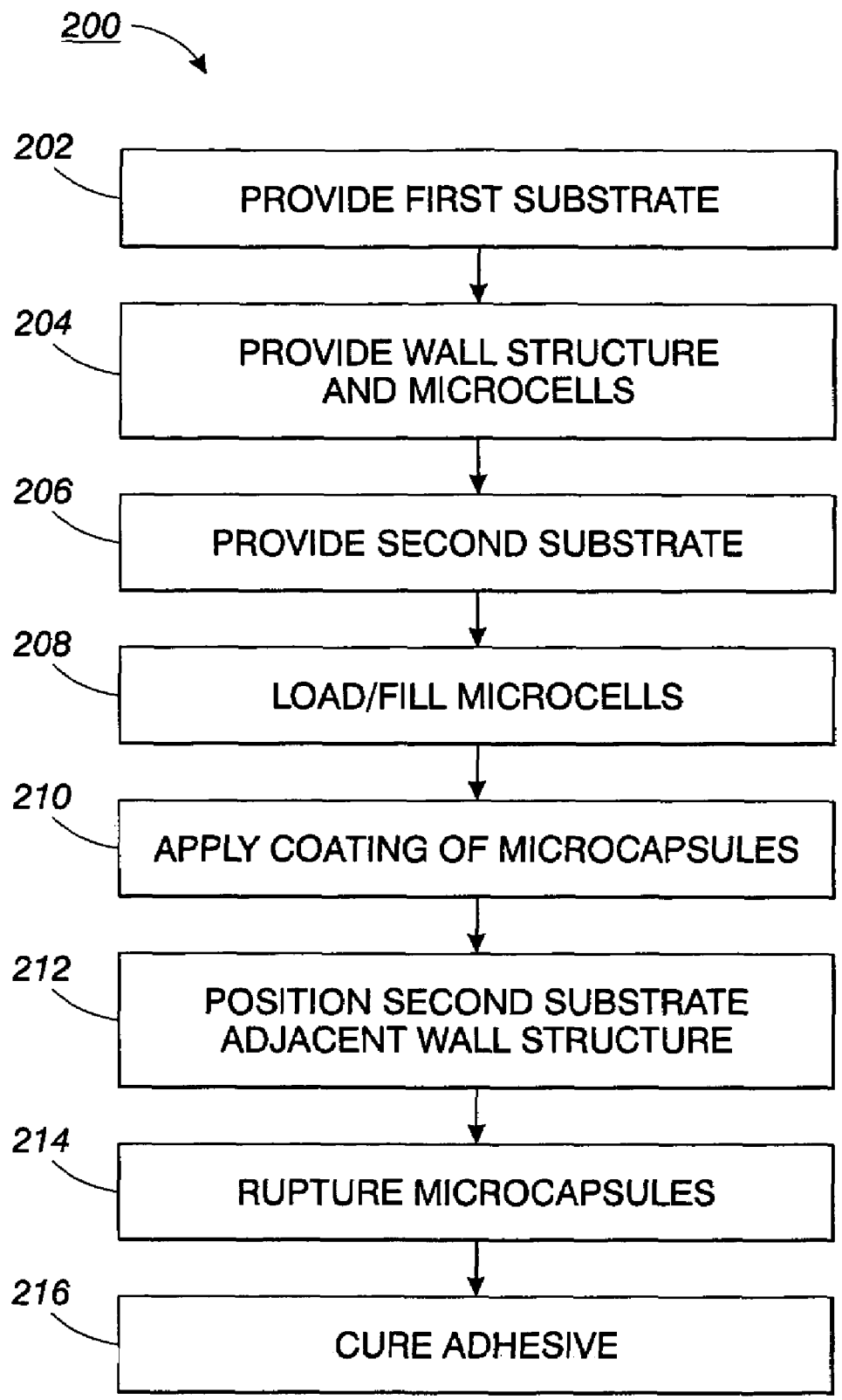
FIG. 5 is a flow chart illustrating steps of a method of sealing cells of a microstructure.

FIG. 5 is a flow chart illustrating steps of an exemplary embodiment of a method 200 of sealing an array of cell microstructures using microencapsulated adhesive. One step, shown as item 202, includes providing a first substrate, such as substrate 102 shown in and described with regard to FIGS. 3 and 4, for example. Another step, shown as item 204, includes providing a wall microstructure forming a plurality of microcells. The wall microstructure can be integrally formed on the first substrate or alternately the wall microstructure can be supported on and suitably secured to the first substrate. One example of a wall microstructure and a plurality of microcells are shown respectively as items 106 and 108 in FIGS. 3 and 4. The wall microstructure and microcells can be formed by any suitable process, including photoresist processes, etching processes, photolithography processes, embossing processes, micromolding processes and/or other microfabrication techniques, for example.

Still another step, shown as item 206, includes providing a second substrate, such as second substrate 104 shown in and described with regard to FIGS. 3 and 4, for example. An optional step, not shown in FIG. 5, includes roughening one or more surfaces, such as a first surface 104A of second substrate 104 or end portion 110 of wall structure 106, for example, to improve the rupturing of the portion of microcapsules compressively captured between the associated contact points. Roughening can be accomplished to any suitable degree and in any suitable manner, such as by reactive ion etching of the surfaces or by depositing hard microparticles on the surfaces. The microparticles can be formed any suitable material, such as from glass or titania, for example. Additionally, microparticles disposed within the cell, such as titania particles in electrophoretic ink, for example, can also contribute to the rupture of microcapsules.

Yet another step, shown as item 208, includes loading, filling or otherwise disposing a quantity of a substance in one or more of the microcells. Examples of such substances can include electrophoretic liquid, such as one-particle ink and two-particle ink, for example, magnetophoretic liquid, dyed liquid, fluorescent liquid, phosphorescent liquid, liquid crystal, toner particles, phosphorescent powder, biological fluid or powder, perfume, combustible liquid, lubricant, a micromechanical device and/or a microelectromechanical device or component. In one example of an embodiment including a micromechanical and/or microelectromechanical device, the device may be present on the substrate prior to the cell walls being patterned. In the case of this and other examples, step 208 is not performed. It will be appreciated, however, that any suitable or desired substance, device or component can be used. It will be further appreciated that any suitable quantity of a substance can be used, including quantities sufficient to fully fill, partially fill, or even overfill the microcells. A further step, shown as item 210, includes applying a plurality of microcapsules along at least one of the two or more surfaces to be interfaced or otherwise secured together. Examples of such surfaces include first side 104A of second substrate 104 and end portion 110 of wall microstructure 106. It will be appreciated that the plurality of microcapsules can be applied in a substantially continuous coating along one or more surfaces. Alternately, the microcapsules can be applied to one or more of the surfaces in a suitable regular or irregular pattern.

The microcapsules can be applied or otherwise deposited on the desired surface or wall microstructure in any suitable manner, such as dip-coating, spray-coating, spin-coating, roller-coating, screen printing, electrodeposition, doctorblading or other transfer techniques of blowing, sprinkling or propelling the microcapsules. The microcapsules can be retained on the desired surface or wall microstructure in any suitable manner, such as by using electrostatic forces, an adhesive substance, or in certain microcapsule arrangements by utilizing properties of the microcapsules themselves. For example, for microcapsules having gelatin-based shells, the microcapsules can be applied along the surface before the shells are completely dry. As the shells dry, an adhesive bond is formed with the surface thereby securing the microcapsules thereto. As another example, the microcapsules can be deposited on the desired surface and the temperature of the microcapsules thereafter raised to a suitable softening point.

Once softened, the microcapsules will form a bond with the surface and will remain adhered thereto as the same are allowed to cool.

Still a further step, shown as item 212, includes positioning the second substrate adjacent the wall microstructure. Yet a further step, shown as item 214, includes rupturing at least a portion of the plurality of microcapsules to disperse the adhesive substance therein. In one exemplary embodiment, steps 212 and 214 are performed in the same action. This action includes displacing the second substrate toward the wall microstructure a sufficient distance to position the second substrate adjacent the wall microstructure and with sufficient force for the microcapsules compressively captured between the second substrate and the wall microstructure to be ruptured. Another step, shown as item 216, includes curing the adhesive substance dispersed from the ruptured microcapsules. This can be due to the natural inclination of the adhesive substance to cure over a period of time or alternately can be due to a further action, such as directing radiation (e.g. visible and/or ultraviolet light) and/or heat on the adhesive substance, for example. It will be appreciated that in addition to the adhesive substance dispersed from the ruptured microcapsules, the adhesive substance within the unruptured microcapsules can also cure or be cured.

Figure 6:
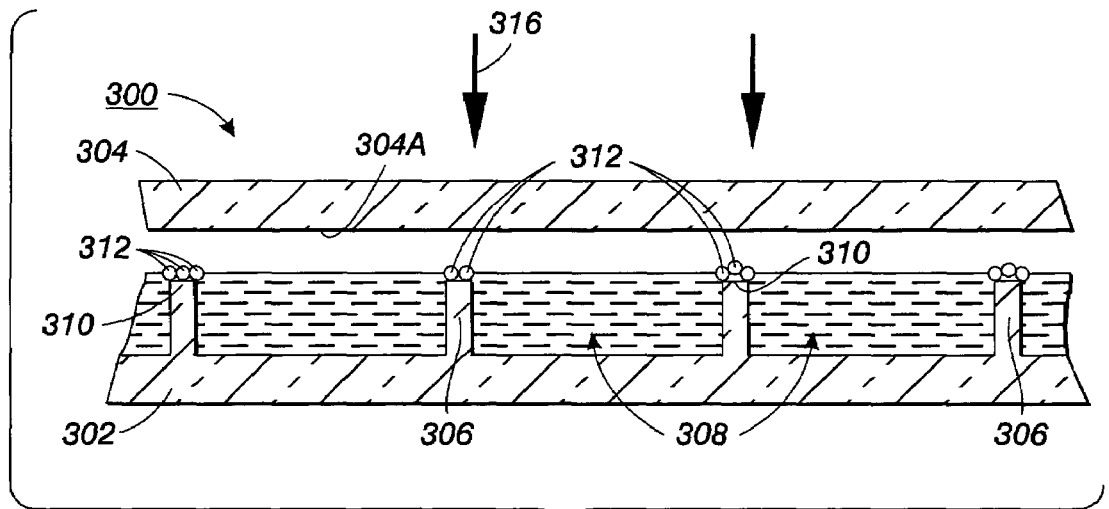
FIG. 6 is a side view, partially in cross section, of a substrate prior to assembly on a wall microstructure having adhesive microcapsules positioned on an end portion thereof.

Another exemplary embodiment of a microcell structure 300 is shown in FIG. 6. It will be appreciated that microcell structure 300 is substantially similar to microcell structure 100 shown in and described with regard to FIG. 3. Unless otherwise indicated, the items in FIG. 6 correspond to those illustrated and discussed with regard to FIGS. 3 and 4. However, the items in FIG. 6 include reference numerals incremented by 200.

Microcell structure 300 includes a first substrate 302, a second substrate 304, and a wall microstructure 306 disposed therebetween and forming a plurality of microcells 308. Wall microstructure 306 has an end portion 310 that extends in a substantially planar manner in substantial alignment with first substrate 302. A plurality of adhesive microcapsules 312 is disposed along end portion 310 of wall microstructure 306, rather than along first side 104A of second substrate 104 as shown in FIG. 3. Microcapsules 312 can be secured to end portion 310 in any suitable manner, such as those described hereinbefore. One example of a suitable manner of securing microcapsules 312 to end portion 310 is by using a suitable adhesive layer (not shown) disposed along end portion 310, for example, in a manner similar to layer 114 shown in and described with regard to FIG. 3. An arrow 316 indicates displacement of second substrate 304 toward wall microstructure 306 to assemble microcell structure 300. It will be appreciated that the construction of microcell structure 300, once assembled, will be substantially similar to structure 100 shown in and described with regard to FIG. 4. However, the plurality of unruptured microcapsules 112A shown in FIG. 4 will be eliminated or significantly reduced in structure 300.

Figure 7:
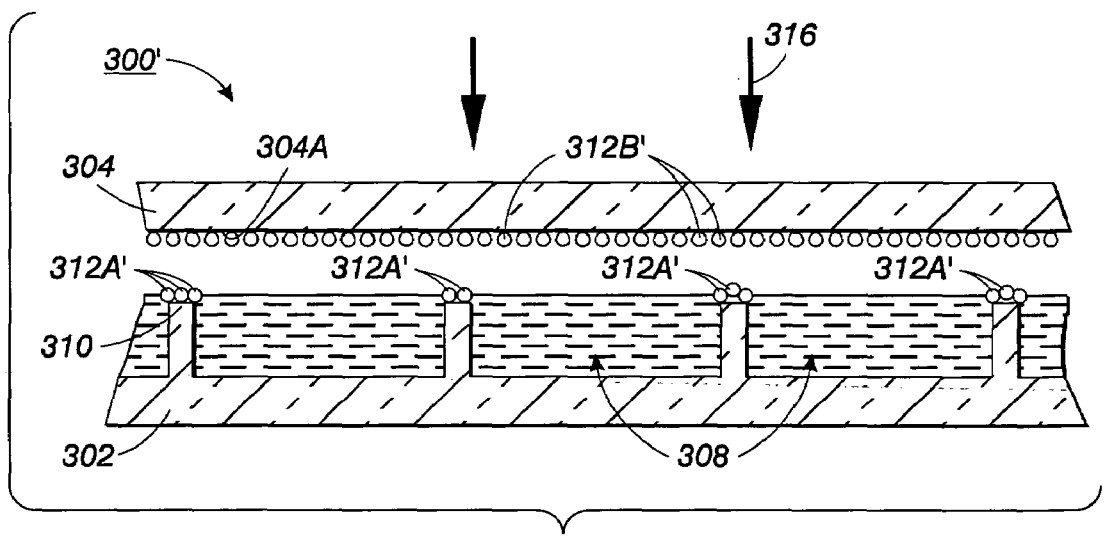
FIG. 7 is a side view, partially in cross section, of a substrate prior to assembly on a wall microstructure with a plurality of adhesive microcapsules disposed along each of the flexible substrate and an end portion of the wall microstructure.

Alternately, a microcell structure 300', shown in FIG. 7, can include a first plurality of adhesive microcapsules 312A' and a second plurality of adhesive microcapsules 312B'. First plurality of microcapsules 312A' is disposed along end portion 310, in a manner similar to that in FIG. 6. Second plurality of microcapsules 312B' is disposed along first side 304A of second substrate 304. As second substrate 304 is displaced toward wall microstructure 306, as indicated by arrow 316, the microcapsules that are compressively captured between the second substrate and the wall microstructure are ruptured allowing the adhesive substance therein to disperse and seal the microcells.

In one exemplary embodiment, microcapsules 312A' contain a first component of a multi-part adhesive, and microcapsules 312B' contain a second component of the multi-part adhesive. Alternately, microcapsules 312A' and 312B' could be mixed together in a suitable manner that will not cause the premature rupture thereof. Thereafter, the microcapsules 312A' and 312B' can be applied at one time and in one action along one or more of the surfaces to be joined. In either case, as the microcapsules compressively captured between the second substrate and the wall microstructure are ruptured the two component parts of the adhesive are dispersed together enabling the adhesive substance to cure or otherwise seal the microcells.

Figure 8:
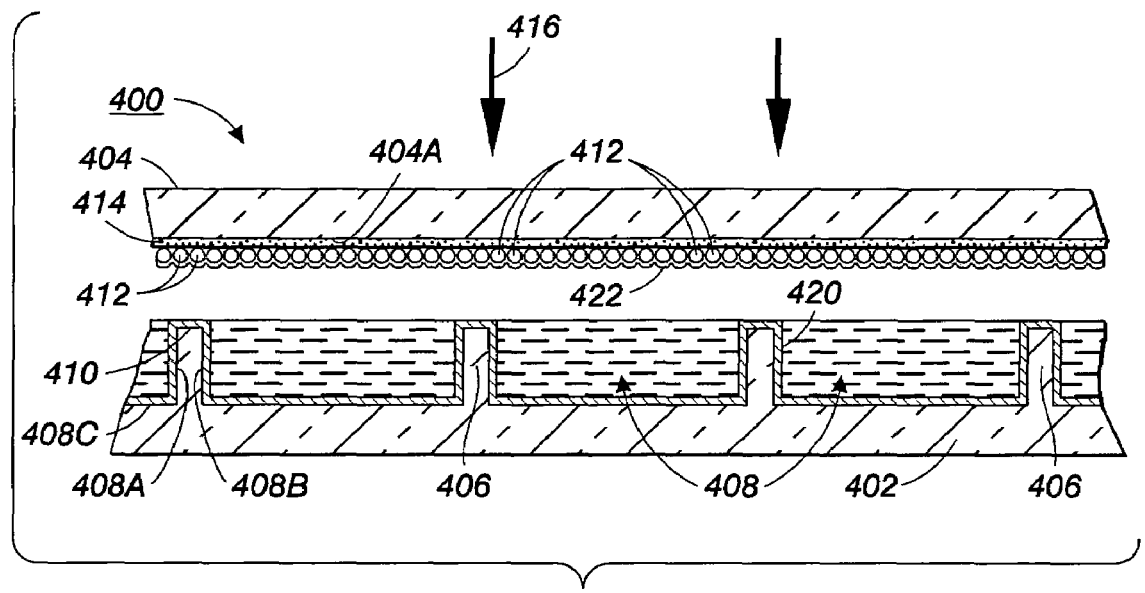
FIG. 8 is a side view, partially in cross section, of a substrate having a plurality of adhesive microcapsules disposed therealong prior to assembly with a wall microstructure and with a coating disposed along the plurality of microcapsules and the wall microstructure; and, FIG. 9 is a side view, partially in cross section, of the substrate in FIG. 8 assembled on the wall microstructure with a plurality of the adhesive microcapsules ruptured.
Figure 9:
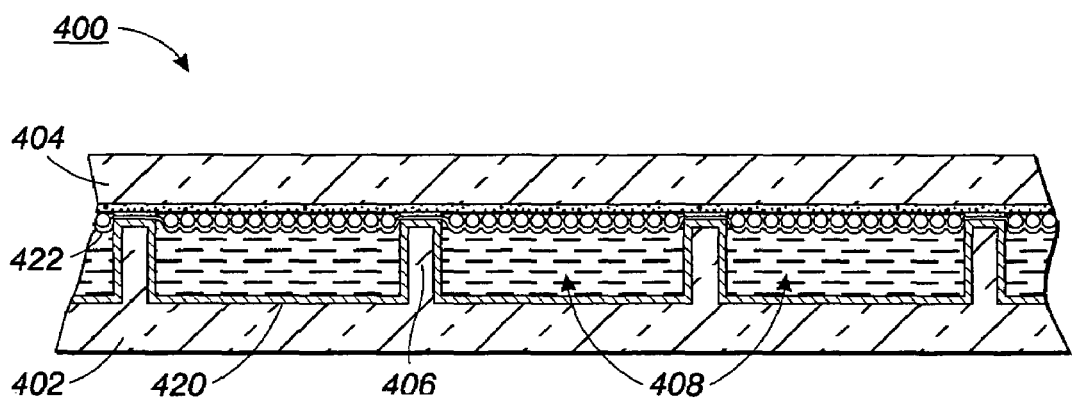

With regard to FIGS. 8 and 9, a microcell structure 400 is illustrated. Unless otherwise indicated, the items in FIGS. 8 and 9 correspond to those illustrated in and discussed with regard to FIGS. 3 and 4. However, the items in FIGS. 8 and 9 include reference numerals incremented by 300. Items shown in and discussed with regard to one drawing figure but having no counterpart in one or more of the other drawing figures will be distinctly pointed out and discussed where appropriate.

Microcell structure 400 includes a first substrate 402, a second substrate 404 and a wall microstructure 406 forming microcells 408. Prior to loading or otherwise filling the microcells, a coating 420 is deposited along the surfaces of the microcells, such as sides 408A and 408B as well as bottom 408C, and end portion 410 of wall microstructure 406. Additionally or alternately, a coating 422 can be deposited on adhesive microcapsules 412 opposite first side 404A and adhesive layer 414. As second substrate 404 is displaced toward wall microstructure 406, as indicated by arrow 416, at least a portion of microcapsules 412 are compressively captured and caused to rupture, as discussed above. As such, it is desirable for the coating to be thin and fragile enough so that the same will break at the contact points at which the microcapsules are ruptured. Once assembled, coatings 420 and 422 remain within microcells 408 as shown in FIG. 9.

Coatings 420 and 422 can be of the same or different materials and can be applied to the respective surfaces at the same or different times. The coating materials can include any suitable material for providing a corresponding desired benefit or feature, such as modifying the surface properties of one of the microcapsules and the microcell walls, for example. Additionally, the coatings can be of any suitable thickness for the corresponding coating material that is being applied. Examples of particularly useful coatings include metallic coatings and molecular coatings. It will be appreciated that a suitable molecular coating may or may not chemically react with the surface or surfaces upon which the coating is applied. This will be application specific and depend upon a variety of factors as are well known by those of skill in the art.

One type of a molecular coating can be formed from a polymer material, such as a fluorocarbon film used where electrophoretic ink is disposed within the microcells, for example. Here, the purpose of the fluorocarbon film would be to prevent or minimize irreversible particle adhesion to the cell walls. However, such a fluorocarbon coating typically will not chemically react with the surface molecules of the substrate upon which the coating is deposited. One suitable fluorocarbon polymer is available under the trademark CYTOP from Asahi Glass Co., Ltd. of Tokyo, Japan.

Other types of molecular coating can include a biological substance (e.g. an organic substance) or chemical compound (e.g. an organic or inorganic compound) respectively having biologically or chemically active or inert properties, such as a silane coating or a bioactive coating, for example. An example of a suitable use of such a molecular coating would be to prevent or to stimulate protein absorption on the walls of the microcells where the content thereof is a biological fluid. Examples of suitable silane coatings include amino functional silanes, such as aminopropyltriethoxysilane, for example, long-chain silanes, such as octadecyltrichlorosilane, for example, and fluorosilanes, such as tridecafluoro-tetrahydrooctyl-trichlorosilane, for example. Additionally, a silazane coating can be used, such as hexamethyidisilazane, for example. Silane and silazane coatings and other surface functional coatings known to those of skill in the art are molecular coatings that typically react with the substrate surface and bind thereto. Once such coatings are applied to the surface of the substrate, the molecules thereof may in some instances react with each other and form a polymer. Silane and silazane materials and other surface functional materials for forming molecular coatings are well known by those of skill in the art and are commonly available, such as from Gelest, Inc. of Tullytown, Pa.

Still another type of coating can be formed from a metallic material, such as gold, silver or aluminum, for example, or a combination of materials, such as gold with a silanized surface, for example. Metallic coatings can provide desired optical properties, such as light reflectivity, for example, and/or electrical conductivity. One example of a suitable coating thickness is from about 0.01 microns to about 0.5 microns.

Silane coatings are typically as thin as about one (1) molecular monolayer to about several molecular monolayers. Additionally, a self-assembled monolayer can be used. It will be appreciated that molecular coatings, especially molecular monolayer-thin surface coatings, are commonly referred to as surface modifiers or coupling agents by those of skill in the art.

It will be appreciated that microencapsulation is generally well known by those of skill in the art. However, the microcapsules used in any one application will typically have properties to achieve the objectives of the application. In one exemplary embodiment directed to the manufacture of flexible displays, it is desirable for the microcapsules to have certain electrical and optical properties. For example, it is generally desirable for the microcapsules to have a dielectric constant that is equal to or greater than the dielectric constant of the electrophoretic ink in an electrophoretic display. Additionally, for use in such displays, it is generally desirable for the adhesive and microcapsules to have a relatively high level of optical clarity and/or transparency, with the refractive index being about the same as that of the contents of the microcell to minimize scattering. In some applications, some scattering may be beneficial to assist in washing out reflections. In other applications, including those in which the electrophoretic particles move laterally, the microcapsules can be optimized to produce retro-reflections, such as by coating the microcapsules with a metallic material, for example.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of enclosing a plurality of microstructural chambers containing a substance, said method comprising steps of:
   a) providing a first substrate and a second substrate, said first substrate having a wall microstructure with an exposed end portion and forming said plurality of microstructural chambers;
   b) applying and affixing a plurality of microcapsules along one of a first side of said second substrate and said end portion of said wall microstructure, said microcapsules containing one of an adhesive substance and a first component of a multi-part adhesive substance;
   c) covering at least a portion of said plurality of affixed microcapsules with a first coating operative to modify an interaction between the substance, said plurality of microcapsules and a corresponding one of said first and second substrates upon which said plurality of microcapsules are affixed;
   d) positioning said first side of said second substrate adjacent said end portion of said wall microstructure; and,
   e) urging said second substrate toward said end portion of said wall microstructure with a force of sufficient magnitude to rupture said first coating and at least a portion of said plurality of microcapsules such that said adhesive substance is dispensed between said first and second substrates with resulting unruptured portions of said first coating remaining within said plurality of microstructural chambers for modifying said interaction between the substance, said plurality of microcapsules and said corresponding one of said first and second substrates.

2. A method according to claim 1 further comprising a step of loading said plurality of microstructural chambers prior to step d) with a quantity of said substance selected from the group consisting of electrophoretic liquid, magnetophoretic liquid, dyed liquid, fluorescent liquid, phosphorescent liquid, liquid crystal, toner particles, phosphorescent powder, biological fluid, biological powder, perfume, combustible liquid, lubricant, a micromechanical device and a microelectromechanical device.

3. A method according to claim 1 further comprising a step of applying an adhesive layer along said one of said first side of said second substrate and said end portion of said wall microstructure prior to step b) for affixing said plurality of microcapsules to said one of said first side of said second substrate and said end portion of said wall microstructure in step b).

4. A method according to claim 1, wherein a first portion of said microcapsules contain a first part of a multi-part adhesive and a second portion of said microcapsules contain a second part of said multi-part adhesive, said method further comprising steps of intermixing said first and second portions of said microcapsules and applying said intermixed microcapsules along one of a first side of said second substrate and said end portion of said wall microstructure.

5. A method according to claim 1 wherein covering at least a portion of said plurality of affixed microcapsules with said first coating includes forming said first coating from a material selected from the group consisting of fluorocarbon, silane and silazane.

6. A method according to claim 1, wherein said microcapsules contain a first component of a multi-part adhesive, said method further comprising a step of applying a second component of said multi-part adhesive along one of said first side of said second substrate and said end portion of said wall microstructure.

7. A method according to claim 6, wherein said second component of said multi-part adhesive is microencapsulated, said microcapsules containing said first component are disposed along one of said first side of said second substrate and said end portion of said wall microstructure, and said microcapsules containing said second component are disposed along the other of said first side of said second substrate and said end portion of said wall microstructure.

8. A method according to claim 1, wherein said plurality of microstructural chambers each have an inside surface, said method further comprising a step of applying a second coating along at least one of said end portions of said wall structure, said inside surface of said plurality of microstructural chambers or said first substrate prior to step e), said second coating operative to modify an interaction between the substance and at least one of said plurality of microcapsules, said first substrate and said second substrate.

9. A method according to claim 8, wherein said second coating is disposed along at least said end portions of said wall structure and step e) includes rupturing at least a portion of said second coating.

10. A method according to claim 8, wherein said second coating is one of a molecular coating and a metallic coating was inserted.

11. A method according to claim 10, wherein said second coating is a molecular coating and includes one of a polymeric material, an inorganic compound, a fluorocarbon film, a silane layer, a silazane layer, and a biological substance.

12. A method of sealing microstructures, said method comprising:
 a) providing a microstructure presented on a first substrate, said microstructure including an end surface and a plurality of inside surfaces at least partially forming a plurality of corresponding microstructural chambers;
 b) depositing one of an electrophoretic substance and a magnetophoretic substance within said microstructural chambers;
 c) providing a second substrate having a first side;
 d) applying and adhering a plurality of adhesive microcapsules containing an adhesive substance along one of a portion of said end surface of said microstructure and a portion of said first side of said second substrate;
 e) depositing a first coating suitable for modifying an interaction of particles within said one of said electrophoretic substance and said magnetophoretic substance with at least one of said plurality of adhesive microcapsules and a corresponding one of said first and second substrates upon which said plurality of adhesive microcapsules are adhered, said first coating being deposited along one of:
  i) at least some of said plurality of adhesive microcapsules, and
  ii) said portion of said end surface of said microstructure;
 f) positioning said first side of said second substrate toward said end surface of said microstructure;
 g) bringing said second substrate and said microstructure together and thereby establishing an approximate contact zone between said first side of said second substrate and said end surface of said microstructure with a portion of said plurality of adhesive microcapsules and a portion of said first coating disposed within said approximate contact zone; and,
 h) rupturing said portion of said first coating within said approximate contact zone and at least some of said portion of adhesive microcapsules within said approximate contact zone and thereby dispensing said adhesive substance between said first side of said second substrate and said end surface of said microstructure, said rupturing of said first coating resulting in individual unruptured portions of said first coating being disposed within said microstructural chambers for modifying said interaction of said particles within said one of said electrophoretic substance and said magnetophoretic substance with at least one of said plurality of adhesive microcapsules and said corresponding one of said first and second substrates upon which said plurality of adhesive microcapsules are adhered.

13. A method according to claim 12, wherein d) includes providing a first molecular coating material selected from a group consisting of a polymeric material, a fluorocarbon compound, a biological substance and a chemical compound, and depositing said first molecular coating material as said first coating.

14. A method according to claim 12, wherein depositing said first coating includes forming said first coating from a material selected from the group consisting of fluorocarbon, silane and silazane.

15. A method according to claim 12, wherein said first coating is deposited along one of said microstructure and said second substrate, and said method further comprises depositing a second coating along the other of said microstructure and said second substrate prior to f) such that a portion of said second coating is disposed within said approximate contact zone and g) includes rupturing said portion of said second coating within said approximate contact zone.

16. A method according to claim 15, wherein d) includes providing a first coating material and depositing said first coating material as said first coating, and wherein depositing said second coating includes providing a second coating material that is different from said first coating material and depositing said second coating material as said second coating.

17. A method according to claim 15, wherein said second coating is one of a molecular coating and a metallic coating.

18. A method according to claim 17, wherein said second coating is a molecular coating and includes one of a polymeric material, an inorganic compound, a fluorocarbon film, a silane layer, a silazane layer, and a biological substance.

19. A method for sealing a plurality of microstructural chambers containing a substance containing one of electrophoretic particles or magnetophoretic particles, the microstructural chambers defined by at least a first substrate and a wall microstructure extending from the first substrate, said method comprising steps of:
 applying and affixing a plurality of adhesive microcapsules along at least one of a first side of a second substrate and an exposed end portion of the wall microstructure, said adhesive microcapsules containing an adhesive substance;
 applying a first coating over at least a portion of said affixed plurality of adhesive microcapsules with said first coating operative to minimize irreversible adhesion of the electrophoretic particles or the magnetophoretic particles of the substance to at least one of the first substrate, the second substrate and said affixed plurality of adhesive microcapsules;
 positioning the first side of the second substrate adjacent the end portion of the wall microstructure; and, rupturing at least a portion of said first coating and at least a portion of said affixed plurality of adhesive microcapsules such that said adhesive substance is dispensed between the end portion of the wall microstructure and the first side of the second substrate with remaining unruptured portions of said first coating retained within the microstructural chambers and operative to minimize irreversible adhesion of the electrophoretic particles or the magnetophoretic particles of the substance to said at least one of the first substrate, the second substrate and said affixed plurality of adhesive microcapsules.

20. A method according to claim 19 further comprising a step of applying an adhesive layer along one of the first side of the second substrate and the end portion of the wall microstructure for affixing said plurality of adhesive microcapsules thereon prior to said step of applying said plurality of adhesive microcapsules, and said step of applying said adhesive layer includes using at least one of dip-coating, spray-coating, spin-coating, roller-coating, screen printing, electrodeposition, doctorblading and transfer techniques.

21. A method according to claim 19, wherein said plurality of adhesive microcapsules are a plurality of first adhesive microcapsules in which said adhesive substance is a first component of a multi-component adhesive, said method further comprising a step of applying and affixing a plurality of second adhesive microcapsules containing a second component of said multi-component adhesive along one of the first side of the second substrate and the exposed end portion of the wall microstructure.

22. A method according to claim 19, wherein applying said first coating includes forming said first coating from fluorocarbon.

23. A method according to claim 1 further comprising a step of roughening one of the first side of the second substrate and the end portion of the wall microstructure by one of etching and depositing microparticles.

24. A method according to claim 23, wherein the microparticles are formed of one of glass and titania.

25. A method according to claim 19, wherein said step of rupturing includes a step of applying a force to at least one of the first substrate or the second substrate, said force being of sufficient magnitude to rupture said first coating and said adhesive microcapsules.

26. A method according to claim 25, wherein said step of applying a force includes at least one of applying a shear force to at least one of the first substrate or the second substrate and applying pressure over at least one of a second side of the first substrate or a second side of the second substrate.

27. A method according to claim 26, wherein said step of applying a shear force includes using ultrasonic agitation.

28. A method according to claim 19 further comprising a step of curing said adhesive substance after said step of rupturing.

29. A method according to claim 28, wherein said step of curing said adhesive substance includes a step of directing one of radiation and heat on said adhesive substance.

30. A method according to claim 29, wherein a portion of said adhesive substance is cured within unruptured adhesive microcapsules.

31. A method according to claim 19, wherein said plurality of adhesive microcapsules are applied and affixed along the first side of the second substrate, and said step of applying a first coating includes applying said first coating along the first side of the second substrate over at least a portion of said plurality of adhesive microcapsules.

32. A method according to claim 31 further comprising applying a second coating along at least a portion of said wall microstructure, said second coating operative to minimize irreversible adhesion the electrophoretic particles or magnetophoretic particles of the substance to said portion of said wall microstructure along which said second coating is applied.

33. A method according to claim 32, wherein said second coating is a molecular coating.

34. A method according to claim 33, wherein said second coating is a fluorocarbon film.

35. A method according to claim 33, wherein said second coating is a molecular coating that is chemically inert with respect to the electrophoretic particles or magnetophoretic particles of the substance.

* * * * *